United States Patent
Davison et al.

(10) Patent No.: US 7,793,267 B2
(45) Date of Patent: Sep. 7, 2010

(54) COMPUTER SOFTWARE TEST COVERAGE ANALYSIS

(75) Inventors: Matthew Davison, London (CA);
Mechelle Sophia Gittens, London (CA);
David Richard Godwin, Whitby (CA);
Nazim H. Madhavji, London (CA);
Andriy Vladimir Miranskyy, London (CA); Mark Francis Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 999 days.

(21) Appl. No.: 11/549,410

(22) Filed: Oct. 13, 2006

(65) Prior Publication Data
US 2008/0092123 A1 Apr. 17, 2008

(51) Int. Cl.
*G06F 9/44* (2006.01)
*G06F 11/00* (2006.01)

(52) U.S. Cl. .................. 717/128; 717/124; 714/38
(58) Field of Classification Search .......... 717/124–133; 714/37, 38
See application file for complete search history.

(56) References Cited

U.S. PATENT DOCUMENTS

| | | | |
|---|---|---|---|
| 5,291,497 A | 3/1994 | Ulrich et al. | |
| 5,724,504 A | 3/1998 | Aharon et al. | |
| 6,038,378 A | 3/2000 | Kita et al. | |
| 6,330,692 B1 | 12/2001 | Kamuro et al. | |
| 6,378,087 B1 | 4/2002 | Flanagan et al. | |
| 6,694,456 B1 | 2/2004 | Ludwig | |
| 6,701,460 B1 | 3/2004 | Suwandi et al. | |
| 6,959,431 B1 | 10/2005 | Shiels et al. | |
| 7,055,065 B2 | 5/2006 | Farchi et al. | |

(Continued)

FOREIGN PATENT DOCUMENTS

JP 2005339204 A 8/2005

(Continued)

OTHER PUBLICATIONS

Mechelle S. Gittens, "The Extended Operational Profile Model for Usage-Based Software Testing", PhD Thesis, Jan. 2004, The University of Western Ontario, ISBN: 0-612-96816-2.*

(Continued)

*Primary Examiner*—Wei Y Zhen
*Assistant Examiner*—Chung Cheng
(74) *Attorney, Agent, or Firm*—Yee & Associates, P.C.; Justin M. Dillon

(57) ABSTRACT

A computer implemented method, apparatus, and computer usable program code for performing software testing. A first set of traces is compressed to form a first set of compressed traces. The first set of compressed traces is compared to a plurality of additional traces to identify a set of partially matching traces within the plurality of additional traces. The first set of traces is compressed to form a second set of compressed traces. The second set of compressed traces is compressed according to a technique such that the second set of compressed traces contains more information than the first set of compressed traces. The second set of compressed traces is compared to the set of partially matching traces to identify a second set of partially matching traces within the set of partially matching traces. The second set of partially matching traces is placed in a memory.

14 Claims, 8 Drawing Sheets

U.S. PATENT DOCUMENTS

| | | |
|---|---|---|
| 7,421,621 B1 * | 9/2008 | Zambrana .................... 714/38 |
| 7,657,876 B2 * | 2/2010 | Chilimbi ..................... 717/132 |
| 2002/0066077 A1 * | 5/2002 | Leung ........................ 717/126 |
| 2003/0046609 A1 | 3/2003 | Farchi et al. |
| 2005/0223357 A1 | 10/2005 | Banerjee et al. |

FOREIGN PATENT DOCUMENTS

| | | | |
|---|---|---|---|
| WO | 9917199 | A1 | 4/1999 |

OTHER PUBLICATIONS

Abdelwahab Hamou-Lhadj, et al., "Compression Techniques to Simplify the Analysis of Large Execution Traces", 2002, Proc. 10th International Workshop on Program Comprehension, 159-168.*

A. V. Miranskyy, et al., "An Iterative, Multi-Level, and Scalable Approach to Comparing Execution Traces", Sep. 2007, ESEC-FSE '07.*

* cited by examiner

| 1-WORDS 1006 | FREQUENCY | | FREQUENCY DIFFERENCE 1014 | TYPE OF COVERAGE 1016 | |
|---|---|---|---|---|---|
| | TEST TRACE 1010 | REFERENCE TRACE 1012 | | | |
| A | 1 | 1 | 0 | EXACT MATCHING | 1018 |
| D | 2 | 1 | 1 | INSUFFICIENT TESTING ($M_1$) | 1020 |
| B | 1 | 2 | -1 | EXCESSIVE TESTING ($M_2$) | 1022 |
| C | 1 | 2 | -1 | | |
| E | 1 | NA | 1 | MISSING COVERAGE ($M_3$) | 1024 |
| F | 1 | NA | 1 | | |
| H | NA | 1 | 1 | EXCESSIVE COVERAGE ($M_4$) | 1026 |
| G | NA | 1 | 1 | | |

COMPUTER SOFTWARE TEST COVERAGE ANALYSIS

BACKGROUND OF THE INVENTION

1. Field of the Invention

The present invention relates generally to computers and computer software. More particularly, the present invention relates to a computer-implemented method, computer usable program code, and a data processing system for testing traces in a software program to improve performance of the software program.

2. Description of the Related Art

Modern software can be exceedingly complex. Testing modern software for errors can take more time and money than is acceptable. Thus, techniques for testing software more efficiently have been developed.

In one technique, test software traces are compared to reference software traces. A software trace, or trace or execution path, is an execution path followed by a particular software program. A trace can also be described as a set of points in a computer program that can be reached in a sequence during the execution of the computer program. A trace can also be a sequential log of contextual information captured during software execution. A software program can have many software traces. Each software trace has one or more components. A component is a function, test probe, or some other discrete property of an execution path. Thus, a test software trace is an execution path in a software program that is to be tested. A reference trace is an execution path that already has been tested for errors. A reference trace thus contains a number of known reference components that are assumed to be acceptably reliable. By comparing test software traces to reference software traces, software developers can concentrate error analysis only on those trace components that have not been analyzed or tested.

Unfortunately, some modern software is so complex that thousands of test traces exist in a software program. Worse yet, many thousands of reference traces may exist. Each test trace and/or reference trace may contain twenty million or more trace components. Thus, to simplify the process of comparing test traces to reference traces, software developers often compress test traces and reference traces to eliminate most information. For example, one current practice is to compress test traces and reference traces to caller/callee function pairs. Thus, only caller/callee function pairs are compared. Other compression techniques are known, but like the above example they are applied one at a time, with the resulting comparisons usually performed sequentially.

While this practice saves time, this practice is not efficient. While unanalyzed caller/callee function pairs might be identified, many other unanalyzed components in the test traces may go unidentified due to the loss of information during compression. Thus, the overall quality of the final software product might suffer from lack of testing of the unidentified components.

SUMMARY OF THE INVENTION

Illustrative embodiments provide a computer implemented method, apparatus, and computer usable program code for performing software testing. A first set of traces is compressed to form a first set of compressed traces. The first set of compressed traces is compared to a plurality of additional traces to identify a set of partially matching traces within the plurality of additional traces. The first set of traces is compressed to form a second set of compressed traces. The second set of compressed traces is compressed according to a technique such that the second set of compressed traces contains more information than the first set of compressed traces. The second set of compressed traces is compared to the set of partially matching traces to identify a second set of partially matching traces within the set of partially matching traces. The second set of partially matching traces is placed in a memory. In one illustrative example, the first set of traces is a single test trace.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
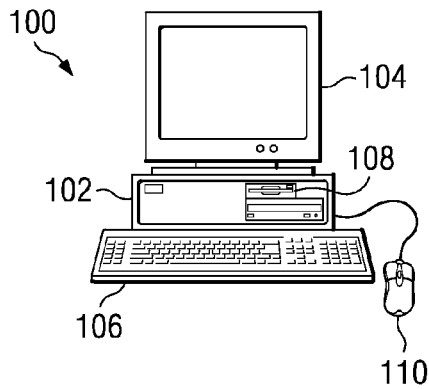
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
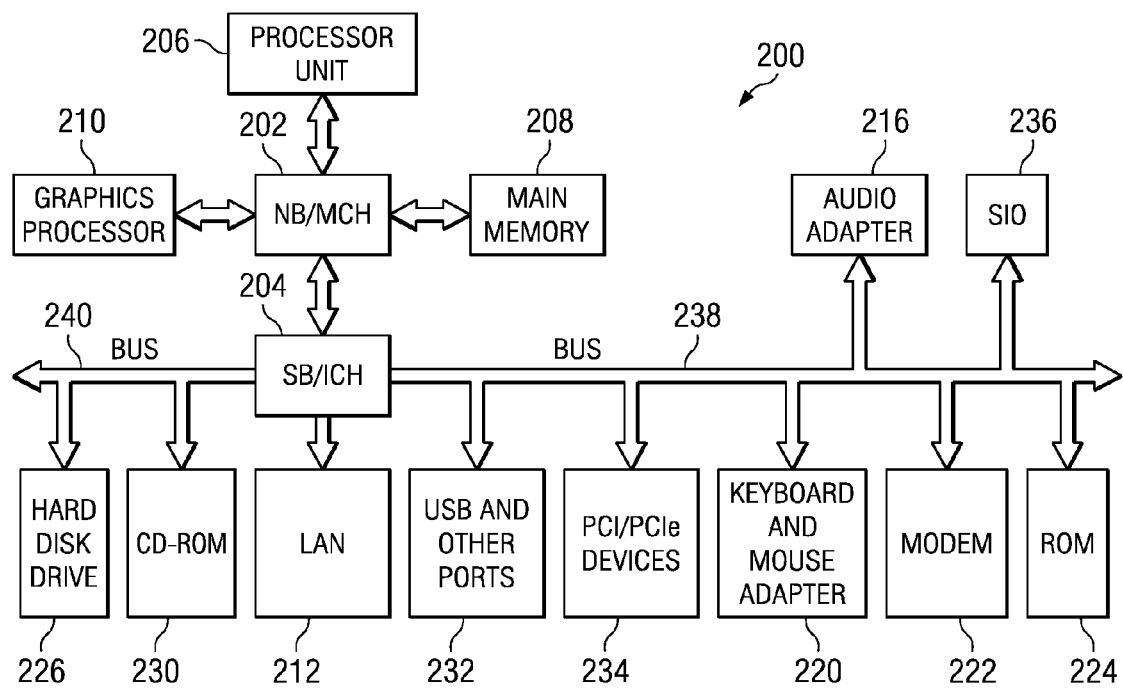
FIG. 2 is a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both. Other operating systems and virtual machines can also be used to implement the illustrative embodiments described herein.

Instructions for the operating system, the object-oriented programming system, and applications or programs are located on storage devices, such as hard disk drive 226. These instructions may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The processes and methods described with respect to the depicted embodiments may be performed in a data processing system, such as data processing system 100 shown in FIG. 1 or data processing system 200 shown in FIG. 2.

Illustrative embodiments provide a computer implemented method, apparatus, and computer usable program code for performing software testing. In an illustrative example, a first set of traces is compressed to form a first set of compressed traces. A set of traces can be any number of traces including one trace. A trace, also known as an execution path, is a set of points in a computer program that can be reached in a sequence during the execution of the computer program. A trace can also be a sequential log of contextual information captured during software execution. Each of the set of points is known as a component. A trace can be captured from a multithreaded environment. In this case, the log from each thread is processed as a separate trace. A component can be, for example, a function, a function entry, a function exit, a developer-inserted probe, a datum of contextual information captured during software execution, or other components.

A trace can be compressed by a variety of methods, such as by the methods described below in FIG. 9 and FIG. 10, or by a variety of additional known methods. Compressing a trace simplifies the trace in the sense that information or functions are removed from the trace. For example, a trace can be compressed to contain only caller/callee function pairs or even the frequency counts of function calls.

Continuing the illustrative process of performing software testing, the first set of compressed traces is compared to a number of additional traces to identify a set of partially matching traces within the number of additional traces. A set of partially matching traces is one or more partially matching traces The number of additional traces is one or more traces. The actual number of traces used depends on the particular implementation. The order of components is unimportant to whether the first compressed trace matches the second compressed trace. The order of components can be, and generally is, important for uncompressed traces. In these examples described herein, a first trace matches a second trace if all of the components in the first trace match the second trace. A first trace partially matches a second trace if one or more components of the first trace match one or more components of the second trace.

Thereafter, the first set of traces is compressed again to form a second set of compressed traces. The second set of compressed traces is compressed according to a technique such that the second set of compressed traces contains more information than the first set of compressed traces. Thus, for example, the second set of compressed traces may include more components or may contain more information regarding components that were included in the first compressed trace.

The second set of compressed traces is compared to the set of partially matching traces to identify a second set of partially matching traces within the set of partially matching traces. The second set of partially matching traces is placed in a memory so that the second set of partially matching traces can be compared to the first set of traces, where the first set of traces is uncompressed. The memory is a storage device which can be implemented as system memory, a hard disk drive, an optical drive, a floppy disk drive, an external memory drive, a tape storage device, or any other suitable storage medium for storing data. The process can be iterated as desired to create a narrow set of partially matching reference traces.

Finally, the set of uncompressed test traces is compared to the narrow set of partially matching reference traces. Any components found in the test traces, but not in the narrow set of reference traces are more likely to contain errors. These components are known as unanalyzed components. Efforts or tests to find errors in the software being tested can focus on the unanalyzed components in order to maximize efficiency and save time and money on the software testing process.

Figure 3:
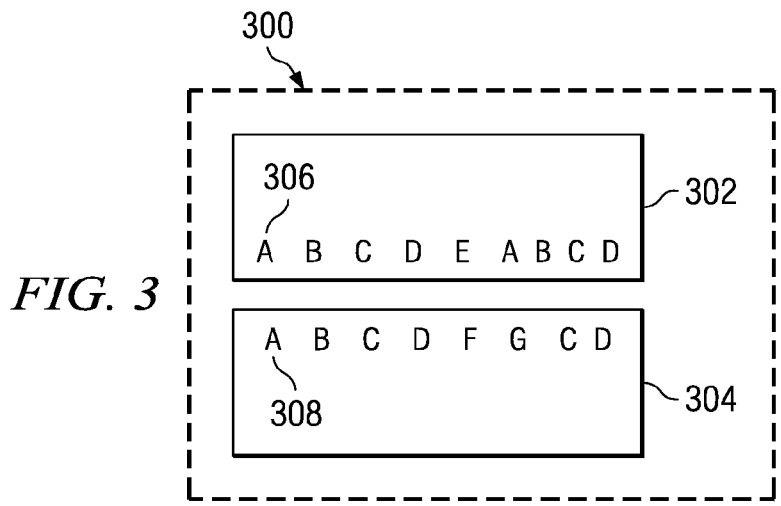
FIG. 3 is a block diagram of a test trace and a reference trace in accordance with an illustrative embodiment.
Figure 4:
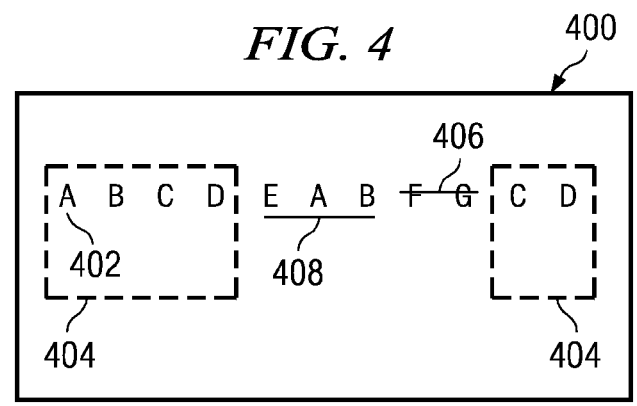
FIG. 4 is a block diagram of a comparison of the test trace and the reference trace shown in FIG. 3 in accordance with an illustrative embodiment.

Returning to the figures, FIG. 3 and FIG. 4 together show an exemplary process of identifying trace components to be analyzed for errors. In order to avoid unnecessary time and expense, only those trace components that do not exist in a number of reference traces should be analyzed for errors.

In particular, FIG. 3 is a block diagram of a test trace and a reference trace in accordance with an illustrative embodiment. Traces 300 include test trace 302, and reference trace 304 and can be implemented using known programming techniques. Test trace 302, and reference trace 304 can be stored on a computer-usable medium and can be manipulated using a data processing system, such as data processing system 100 shown in FIG. 1 or data processing system 200 shown in FIG. 2.

Both test trace 302 and reference trace 304 are part traces 300 involved in the software testing process. Test trace 302 is a trace that is a part of the software being tested. Test trace 302 can also be referred to as a user trace or a trace of interest. In the above example, test trace 302 is the first trace.

Reference trace 304 is a trace that has already been subject to testing and analysis. Thus, reference trace 304 is assumed to contain no errors, to contain few errors, or to contain known errors that can be specifically addressed. Reference trace 304 can also be referred to as a house trace.

Both test trace 302 and reference trace 304 include a number of components. For example, test trace 302 contains component A 306. Reference trace 304 also contains component A 308. Component A 306 and component A 308 are the same component, though each component is in a different trace. Each of test trace 302 and reference trace 304 contain additional components represented by alphabetic letters. Alphabetic letters in test trace 302 are the same components as corresponding alphabetic letters in reference trace 304.

Analyzing every component in test trace 302 would be time consuming and costly. Additionally, the number of traces to be tested in a given software program to be tested can be extremely high, numbering in the thousands or even millions. Fortunately, many components are re-used. Testing re-used components often is deemed unnecessary. Thus, test trace 302 can be compared to reference trace 304 to identify those components that have not yet been analyzed for errors. Those identified components can then be analyzed for errors.

FIG. 4 is a block diagram of a comparison of the test trace and the reference trace shown in FIG. 3 in accordance with an illustrative embodiment. Comparison 400 shown in FIG. 4 is a result of the comparison of test trace 302 and reference trace 304 in FIG. 3. Comparison 400 can be stored on a computer-usable medium and can be manipulated using a data processing system, such as data processing system 100 shown in FIG. 1 or data processing system 200 shown in FIG. 2.

As described above, a test trace can be compared to a reference trace to identify those components that have not yet been analyzed for errors. In FIG. 4, trace comparison 400 shows a number of components represented by alphabetic letters, such as component A 402. Trace comparison 400 contains every component in both the test trace and the component trace.

Components common to both traces are shown in phantom boxes 404. These common components need not be analyzed because these common components are known traces and can thus be re-used.

Trace comparison 400 also shows overtested components 406, shown in strike-through font. Overtested components 406 are components that exist in the reference trace but not in the test trace. Overtested components 406 were compared unnecessarily to the test trace. Thus, if possible, eliminating overtested components 406 from future testing of the test trace is desirable.

Trace comparison 400 also shows unanalyzed components 408, shown in underline font. Unanalyzed components 408 are components that exist in the test trace but not in the reference trace. Unanalyzed components 408 represent those components of interest because unanalyzed components 408 have not yet been tested. In this manner, unanalyzed components 408 are identified for further analysis and testing for errors.

Figure 5:
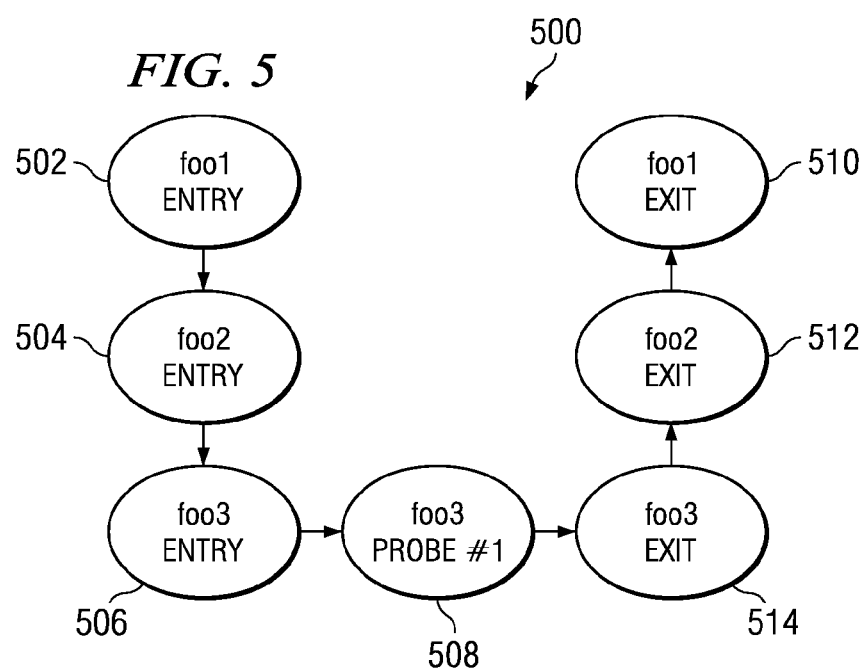
FIG. 5 is a block diagram of a test trace in accordance with an illustrative embodiment.

FIG. 5 is a block diagram of a test trace in accordance with an illustrative embodiment. FIG. 5 represents an alternative method of representing a trace. Thus, test trace 500 is an alternative representation of test trace similar to trace 302 in FIG. 3. Test trace 500 can be stored on a computer-usable medium and can be manipulated using a data processing system, such as data processing system 100 shown in FIG. 1 or data processing system 200 shown in FIG. 2.

In these illustrative examples, test trace 500 contains a number of components, represented by the ovals containing the term "foo" followed by a number. The term "foo" is a term used in the art for abstractly representing a function or some other trace component. The number identifies a particular function or other trace components, or a particular "foo".

Foo1 entry 502 represents the entry point into the function represented by foo1. An entry point is the point in a software program where a function begins operation or upon which an operation begins. Similarly, foo2 entry 504 represents the entry point into the function represented by Foo2. Likewise, foo3 506 entry represents the entry point into the function represented by foo3.

Foo3 probe #1 508 is a probe inserted into the function represented by foo3. A probe is a software program or script that is called or that operates at a particular point in the process of a function or other component. The probe returns information regarding the functionality of that function or other component. Thus, foo3 probe #1 508 returns information regarding the operation of foo3.

Foo1 exit 510 represents the exit point from the function represented by foo1. An exit point is the point in a software program where a function ceases operation or where a function is no longer used. Similarly, foo2 exit 512 represents the exit point from the function represented by foo2. Likewise, foo3 514 exit represents the exit point from the function represented by foo3.

Figure 6:
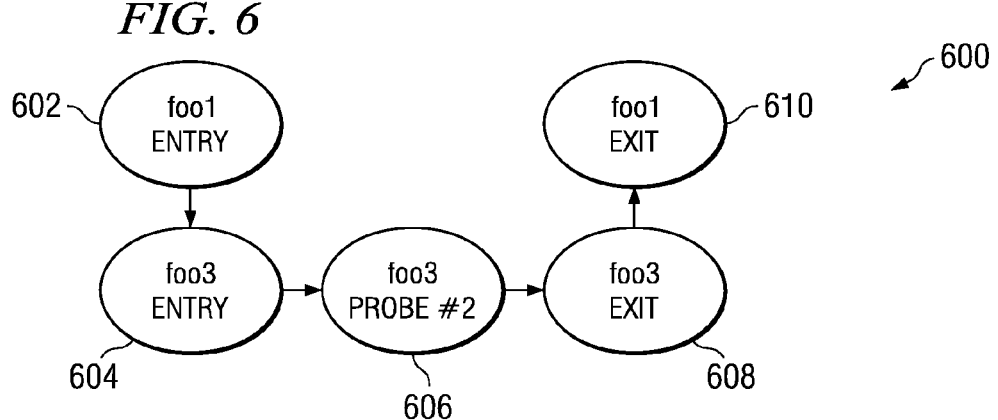
FIG. 6 is a block diagram of a reference trace in accordance with an illustrative embodiment.

FIG. 6 is a block diagram of a reference trace in accordance with an illustrative embodiment. FIG. 6 represents an alternative method of representing a trace. Thus, reference trace 600 is an alternative representation of reference trace similar to trace 304 in FIG. 3. Reference trace 600 can be stored on a computer-usable medium and can be manipulated using a data processing system, such as data processing system 100 shown in FIG. 1 or data processing system 200 shown in FIG. 2. Reference 600 trace is to be compared to test trace 500 in FIG. 5, as described with respect to FIG. 7.

Reference trace 600 is similar to, but not the same as, test trace 500 in FIG. 5. Reference trace 600 contains foo1 entry 602, foo3 entry 604, foo3 probe #2 606, foo3 exit 608, and foo1 exit 610. Similarly named function entry points and exit points in FIG. 6 correspond to like-named function entry points and exit points in FIG. 5.

Figure 7:
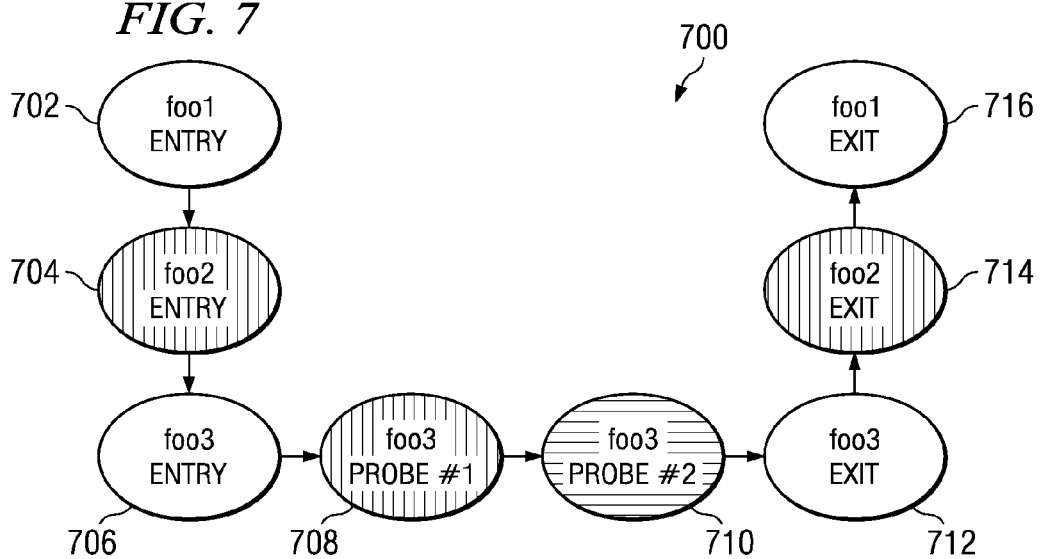
FIG. 7 is a block diagram of a comparison of the test trace and the reference trace shown in FIG. 5 and FIG. 6 in accordance with an illustrative embodiment.

FIG. 7 is a block diagram of a comparison of the test trace and the reference trace shown in FIG. 5 and FIG. 6 in accordance with an illustrative embodiment. FIG. 7 represents an alternative method of representing a trace comparison. Thus, trace comparison 700 is an alternative representation of trace comparison 400 in FIG. 4. Trace comparison 700 can be stored on a computer-usable medium and can be manipulated using a data processing system, such as data processing system 100 shown in FIG. 1 or data processing system 200 shown in FIG. 2.

Trace comparison 700 contains every component in both test trace 500 in FIG. 5 and reference trace 600 in FIG. 6. Thus, trace comparison 700 includes foo1 entry 702, foo2 entry 704, foo3 entry 706, foo3 probe #1 708, foo3 probe #2 710, foo3 exit 712, foo2 exit 714, and foo1 exit 716.

Two different directions of hash marks indicate the differences between the test trace and the reference trace. Horizontal hash marks, such as those shown in foo3 probe #2 710, represent components that exist in the reference trace but not in the test trace. Thus, comparing foo3 probe #2 710 to the test trace is unnecessary. For this reason, foo3 probe #2 710 can be described as a set of components for which coverage is excessive. Preferably, on successive iterations of comparing the test trace to one or more reference traces, the comparison should exclude foo3 probe #2.

Vertical hash marks, such as those shown in foo2 entry 704, foo3 probe #1 708, and foo2 exit 714 represent components that exist in the test trace but not in the reference trace. Thus, further analysis and testing of foo2 entry 704, foo3 probe #1 708, and foo2 exit 714 is desirable to analyze for any errors that might exist in those components. Foo2 entry 704, foo3 probe #1 708, and foo2 exit 714 can also be described as a set of components for which coverage is missing.

Figure 8:
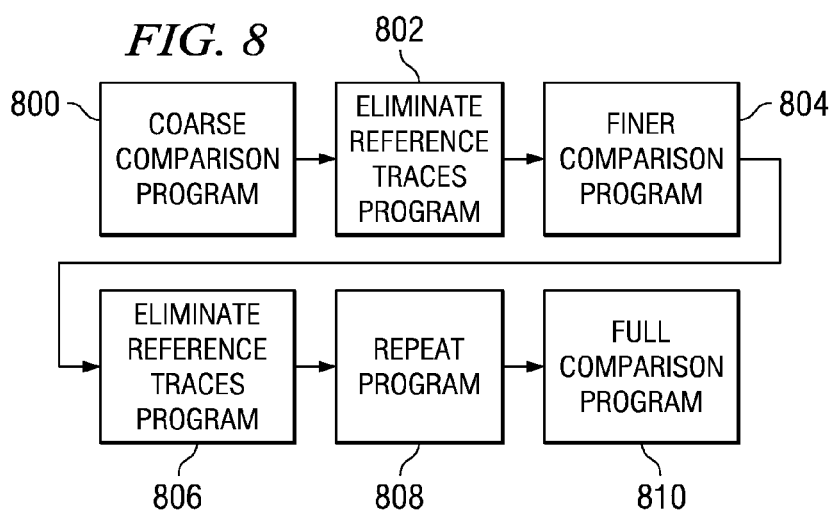
FIG. 8 is a block diagram of software program for use in implementing improved software testing in accordance with an illustrative embodiment.

FIG. 8 is a block diagram of software programs for use in implementing improved software testing in accordance with an illustrative embodiment. Each software program shown in FIG. 8 is described in terms of its functionality in steps of an illustrative process. The software programs shown in FIG. 8 can be part of a single, overall software program. In an illustrative embodiment, each software program shown in FIG. 8 is the same software program implementing different functions. The software programs shown in FIG. 8 can be stored and implemented as a data processing system, such as data processing system 100 shown in FIG. 1 or data processing system 200 shown in FIG. 2. The software programs shown in FIG. 8 compare test traces, such as those shown in FIG. 3 through FIG. 7.

Initially, coarse comparison software program 800 performs a coarse-comparison between a test trace and a group of reference traces. In a coarse comparison, the test trace is compressed using a lossy compression technique that discards most of the information in the test trace. The resulting compressed test trace, referred to as a coarse test trace, is compared to the reference traces, which may also be compressed using a similar technique. Coarse comparison program 800 also can compare reference traces to each other to identify those reference traces that are similar to each other. Coarse comparison program 800 also can compare different test traces to each other to identify those test traces that are similar to each other.

Next, eliminate reference traces program 802 eliminates those reference traces that are very different then the coarse test trace. The term "very different" is evaluated according to the desires of the user; however, the term "very different" includes those reference traces that have no components in common with the test trace. Thus, the number of reference traces is reduced. At worst, the number of reference traces stays the same.

If exactly the same components are found, if the user desires, then the process can be stopped using the particular technique. The process can be stopped because exactly the same path has already been tested in the reference trace. The user may determine that this testing of the same path is satisfactory. At this point, any problems that might exist likely can not be detected using that particular technique.

Next, finer comparison program 804 performs a finer comparison between the test trace and the reduced group of reference traces. In a finer comparison, the test trace is compressed using a lossy compression technique that discards some of the information in the test trace. However, not as much information is lost in the test trace as when the coarse compression is performed. The resulting compressed test trace, referred to as a finer test trace, is compared to the group of remaining reference traces, which may also be compressed using a similar technique. Finer comparison program 804 also can compare reference traces to each other to identify those reference traces that are similar to each other. Finer comparison program 804 also can compare different test traces to each other to identify those test traces that are similar to each other.

Thereafter, eliminate reference traces program 806 eliminates those reference traces that are very different than the finer test trace. Also eliminated are those reference traces that are substantially the same. Thus, the number of reference traces is reduced. At worst, the number of reference traces stays the same.

Repeat program 808 repeats the process described above as desired. Thus, the test trace is compressed iteratively using finer compression techniques at each step. At each step, more reference traces are eliminated. Ultimately, full comparison program 810 compares the uncompressed test trace against any remaining reference traces. The process of performing the comparison on the uncompressed trace is now much less time consuming than had the uncompressed trace been compared to all possible desired reference traces.

Figures 9, 10:
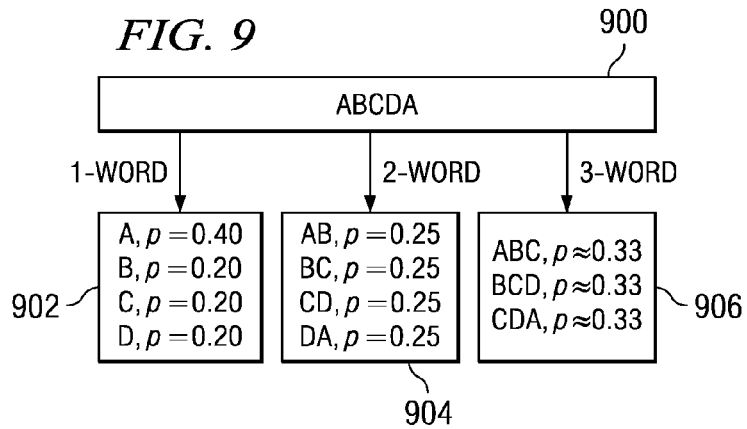
FIG. 9 is a block diagram illustrating "L" words in a trace in accordance with an illustrative embodiment.
FIG. 10 is a table illustrating coverage testing in accordance with an illustrative embodiment.

FIG. 9 is a block diagram illustrating "L" words in a trace in accordance with an illustrative embodiment. The term "L" word, also referred to as an l-word or l word, is defined in the next paragraph. The diagram shown in FIG. 9 illustrates the concept of "L" words as used in one or more different trace compression techniques. The "L" words shown in FIG. 9 can be implemented in a data structure that can be stored in or manipulated by a data processing system, such as data processing system 100 in FIG. 1 or data processing system 200 in FIG. 2. The alphabetic representations of "L" words are components in one or more traces, such as test trace 302 in FIG. 3, reference trace 304 in FIG. 3, or comparison trace 400 in FIG. 4. The "L" words shown in FIG. 9 can be used in coarse comparison program 800 or finer comparison program 804 of FIG. 8.

The "L" words shown in FIG. 9 represent chains of grouped trace components. For example, the letter "A" is a trace component, as is the letters "B", "C", and "D". Thus, a "word", as described with respect to "L" words, is a group of trace components. In several different compression techniques different lengths of words are desired. The length of a word represents the number of alphabetic letters, each representing a component, in the word. A word may have multiple similar components. Thus, the chain has a length, "L", selected from a positive integer in the set of real numbers. Most commonly, "L" words have a value of L equal to 1, 2, or 3, though "L" words can be of any desired length.

In FIG. 9, the total set of components in trace 900 is represented by components A, B, C, D, and A again. If "L" is selected to be 1, then a group of four "L" words exist in trace 900, as shown by "L" word set 902. Specifically, "L" word set 902 includes the words A, B, C, and D. Each word has one instance in trace 900, except for word A which has two instances.

In another example, "L" is selected to be 2. In this case, a group of two-letter long "L" words exist in trace 900, as shown by "L" word set 904. Thus, "L" word set 904 includes the words AB, BC, CD, and DA, each appearing in one instance. The probability of "L" words AA, AC, and BD occurring in this context is zero.

In another example, "L" is selected to be 3. In this case, a group of three-letter long "L" words exist in trace 900, as shown by "L" word set 906. Thus, "L" word set 906 includes the words ABC, BCD, and CDA, each appearing with one instance. The order of the letters in the "L" word is important in this context. Other combinations of letters exist in "L" word set 906, such as but not limited to AAB.

As described above, "L" words can be used in a variety of different known compression techniques. One such compression technique is known as entropy measures.

Trace information can be condensed using tools from Information Theory, such as entropy measures. By evaluating the values of entropy for "L" words with different "L", also referred-to as "l", a vector of "fingerprints" is obtained. A fingerprint is the results obtained from a compression process.

The particular choice of entropy may differ. Examples of known entropy techniques include Shannon's Entropy and the Rényi entropy. Good results can be obtained using Shannon's entropy, defined as $$S_l = -\sum_{i=1}^{N_l} p_i \ln p_i,$$

where $N_l$ is the number of words for length l, and $p_i$ is the probability of i-th l-word. An exemplary calculation of Shannon's entropy for l-words with l=1, 2, 3 is given below, in the context of FIG. 9:

Shannon Entropy for l-word:

$$S_l = -\sum_{i=1}^{N_l} p_i \ln p_i,$$

$$S_1 = -\sum_{i=1}^{N_1} p_i \ln p_i$$

$$= -\sum_{i=1}^{4} p_i \ln p_i$$

$$= -(0.40\ln 0.40 + 0.20\ln 0.20 + 0.20\ln 0.20 + 0.20\ln 0.20)$$

$$\approx 1.33,$$

$$S_2 = -\sum_{i=1}^{N_2} p_i \ln p_i$$

$$= -\sum_{i=1}^{4} p_i \ln p_i$$

$$= -(0.25\ln 0.25 + 0.25\ln 0.25 + 0.25\ln 0.25 + 0.25\ln 0.25)$$

$$\approx 1.39,$$

$$S_3 = -\sum_{i=1}^{N_3} p_i \ln p_i$$

$$= -\sum_{i=1}^{3} p_i \ln p_i$$

$$\approx -(0.33\ln 0.33 + 0.33\ln 0.33 + 0.33\ln 0.33)$$

$$\approx 1.10.$$

Extended entropies provide additional information. An extended entropy can be used in a finer comparison program, such as finer comparison program 804 shown in FIG. 8. An example of an extended entropy method is the Rényi entropy, given by the equation:

$$H_l(q) = \frac{\ln Q(q)}{1-q}, \text{ where } Q(q) \equiv \sum_{k=1}^{N_l} p_k^q,$$

A numerical example of the Rényi entropy calculation for l-words with l=1, 2, 3 and q=0.1 is given below in reference to FIG. 9:

Rényi entropy for l-word:

$$H_l(q) = \frac{\ln Q(q)}{1-q}, \text{ where } Q(q) \equiv \sum_{k=1}^{N_l} p_k^q.$$

For l=1, q=0.1:

$$Q(0.1) \equiv \sum_{k=1}^{N_1} p_k^{0.1}$$
$$= (0.40^{0.1} + 0.20^{0.1} + 0.20^{0.1} + 0.20^{0.1})$$
$$\approx 3.47,$$

$$H_1(0.1) \approx \frac{\ln 3.47}{1-0.1} \approx 1.38,$$

for l=2, q=0.1:

$$Q(0.1) \equiv \sum_{k=1}^{N_2} p_k^{0.1}$$
$$= (0.25^{0.1} + 0.25^{0.1} + 0.25^{0.1} + 0.25^{0.1})$$
$$\approx 3.48,$$

$$H_2(0.1) \approx \frac{\ln 3.48}{1-0.1} \approx 1.39,$$

for l=3, q=0.1:

$$Q(0.1) \equiv \sum_{k=1}^{N_3} p_k^{0.1}$$
$$\approx (0.33^{0.1} + 0.33^{0.1} + 0.33^{0.1})$$
$$\approx 2.69,$$

$$H_3(0.1) \approx \frac{\ln 2.69}{1-0.1} \approx 1.10.$$

The number of fingerprints from extended entropies may be reduced by fitting the l-words probabilities dataset with some distribution governed by a small number of parameters. In this case, entropy values are substituted with parameters of the distribution. For example, the Zipf-Mandelbrot distribution typically produces a good fit. The Zipf-Mandelbrot distribution probability mass function is defined as:

$$pmf(k; \alpha, \beta, N_l) = \frac{(k+\beta)^{-\alpha}}{\sum_{n=1}^{N_l}(n+\beta)^{-\alpha}},$$

where k and n are the frequencies of k-th and n-th l-word, respectively, and $\alpha$ and $\beta$ are parameters governing the distribution. If the quality of fit is low, then the original extended entropy values should be kept.

A subset of closest reference traces can be obtained by calculating the distance between the fingerprints of the reference traces and the fingerprints of the test traces using a norm approach, or other measure of distance chosen by the software developer. The size of the "fingerprint" vector should range between 10 and 100. Such a size is, in general, sufficient to capture main structural properties of the traces.

For example, for Shannon's entropy vector, a trace may contain 10 values of entropy for l=1, . . . , 10. In the case of Rényi entropy, the vector may contain 50 entropy values for l=1, . . . , 10 and q=0.1, 0.5, 1.0, 1.5, 2.0. Use of Zipf-Mandelbrot distribution reduces the vector length from 50 to 20. For each value of l values are stored for 2 parameters that govern the distribution. Vectors closeness may be determined by calculating distance between vectors using existing vector norms such as, for example, a Euclidian vector norm.

In the above description, a trace was compressed using an L-word technique and compared using a norms approach. Additional comparison techniques also exist. For example, for where "L" is greater than 2 in "L" words, a Markov chain comparison technique can be used. In this case, the test trace and reference traces are represented as tables. The rows of the tables represent callers and the columns represent callees. A likelihood ratio test is used to compare the tables. The test statistic is defined as:

$$2 \sum_{1 \le i,j \le m} n_{ij} \ln \frac{p_{ij}^{(RP)}}{p_{ij}^{(IP)}},$$

where $n_{ij}$ is the frequencies of i-th caller and j-th callee pair (bi-gram) in the reference trace, $p_{ij}^{(RP)}$ denotes bi-gram probabilities of the reference trace, $p_{ij}^{(IP)}$-bi-gram probabilities of the test trace, and m is the test trace's dictionary size. The dictionary size is the total number of "L" words that can exist for a given trace, with each "L" word being a word in the trace's dictionary. Under the null hypothesis, two processes having the same probability distributions ($H_0:P_{IP}=P_{RP}$) statistic have an asymptotic $\chi^2$ distribution with m(m−1)−d degrees of freedom. In this case, d is the number of zero transition probabilities in the test trace's dictionary.

Markov chains can be quite large, with matrices being on the order 10,000 by 10,000 elements. However, due to the nature of the problem, each matrix is sparse. In other words, most cells are filled with zeros. The number of non-zero elements in the matrix is usually only about 100,000 cells (instead of the 100,000,000 in case of non-spare matrix). Thus, Markov chains are a useful technique for performing comparison on traces using "L" words.

FIG. 10 is a table illustrating coverage testing in accordance with an illustrative embodiment. The diagram shown in FIG. 10 illustrates the concept of "L" words as used in one or more different trace compression techniques. The "L" words shown in FIG. 10 can be implemented in a data structure that can be stored in or manipulated by a data processing system, such as data processing system 100 in FIG. 1 or data processing system 200 in FIG. 2. The alphabetic representations of "L" words are components in one or more traces, such as test trace 302 in FIG. 3, reference trace 304 in FIG. 3, or comparison trace 400 in FIG. 4. The "L" words shown in FIG. 10 can be used in coarse comparison program 800 or finer comparison program 804 of FIG. 8. The "L" words shown in FIG. 10 are similar to the "L" words described with respect to FIG. 9.

Previously, a trace was compressed using an L-word technique and a comparison was performed using norms and Markov chain techniques. Now, a comparison of L-words in a dictionary using coverage testing is performed. Coverage testing is another type of compression technique that can be used to compare traces. Coverage testing can be referred to as an "N-tuple measure of similarity", where "N" is the number of types of coverage to be tested. Coverage testing specifically performs frequency comparisons for different "L" words described above with respect to FIG. 9. Other comparisons can be used. For example, a relative frequency or percentage frequency comparison can be used.

Test trace 1000 and reference trace 1002 are provided for convenience. Test trace 1000 and reference trace 1002 are used with respect to coverage testing table 1004. Coverage testing table includes a number of rows and columns. Column 1006 includes "L"=l words extant in both test trace 1000 and reference trace 1002. Column 1008 includes the frequency of appearance of each "L"=l word. Column 1008 is subdivided into test trace column 1010, which corresponds to test trace 1000, and reference trace column 1012, which corresponds to reference trace 1002. Column 1014 includes the frequency difference between test trace column 1008 and reference trace column 1012. Type of coverage column 1016 shows the type of coverage for a particular "L"=l word. Thus, for example, the frequency difference between test trace column 1010 and reference trace column 1012 is zero for "L"=l word "A", resulting in an exact matching type of coverage, as shown in row 1018. Other types of coverage include insufficient testing ($M_1$) in row 1020, excessive testing ($M_2$) in row 1022, missing coverage ($M_3$) in row 1024, and excessive coverage ($M_4$) in row 1026.

Quintuple coverage testing (5-tuple) is performed in the illustrative example of FIG. 10. Specifically, the five items tested include exact matching, insufficient testing, excessive testing, missing coverage, and excessive coverage. Exact matching represents the number of words that exactly match between components in the test trace and components in the reference trace. Insufficient testing represents components that exist in both traces, but are more frequent in the test trace. Excessive testing represents components that exist in both traces, but are more frequent in the reference trace. Missing coverage represents components that exist in the test trace but not in the reference trace. Excessive coverage represents components that exist in the reference trace but not in the test trace.

More specifically, the information shown in FIG. 9 can be manipulated as follows to perform a comparison technique. Starting with a set of l-words for a reference trace, the reference trace has an "L" word with a given l defined as $I^{(l)}$. The reference trace's set is denoted by $R^{(l)}$. The cardinality, or number of members, of $I^{(l)}$ is denoted by $X^{(l)}$ and the cardinality of $R^{(l)}$ is denoted by $Y^{(l)}$. Because $X^{(l)}$ and $Y^{(l)}$ are finite, elements $I^{(l)}$ and $R^{(l)}$ can be ordered as follows:

$I^{(l)} = \{i_1^{(l)}, i_2^{(l)}, \ldots, i_{X^{(l)}}^{(l)}\}$, $R^{(l)} = \{r_1^{(l)}, r_2^{(l)}, \ldots, r_{Y^{(l)}}^{(l)}\}$.

From this information, a mapping can be defined as:

$f^{(l)}: \{1, 2, \ldots, X^{(l)}\} \to \Box$, $g^{(l)}: \{1, 2, \ldots, Y^{(l)}\} \to \Box$, where $f^{(l)}(j)$ is the attribute of $i_j^{(l)}$, $g^{(l)}(j)$ is the attribute of $r_j^{(l)}$, and $i$ is the set of all real numbers.

An attribute can depict the value of an l-word's name, frequency, or probability. In this context, a new set can be defined:

$V^{(l)} = I^{(l)} \cap R^{(l)}$, with cardinality $W^{(l)}$, $W^{(l)} \leq \min(X^{(l)}, Y^{(l)})$. Similar to $I^{(l)}$ and $R^{(l)}$, an arbitrary ordering of the elements of $V^{(l)}$ can be made. An ordering can be made of:

$I^{(l)} - V^{(l)}$, $R^{(l)} - V^{(l)}$, and the maps be defined as $f^{(l)}(j)$, $g^{(l)}(j)$ on this quasi-canonical ordering of $f^{(l)}(j)|_{[1,2,\ldots,W^{(l)}]}$ and $g^{(l)}(j)|_{[1,2,\ldots,W^{(l)}]}$, where | denotes restriction.

A set is defined as $T \equiv f^{(l)}(j)|_{[1,2,\ldots,W^{(l)}]} - g^{(l)}(j)|_{[1,2,\ldots,W^{(l)}]}$, for all j. In this set, negative, positive, and zero values exist. Negative values represent insufficient testing in test trace components, positive values represent excessive testing in reference trace components, and zero values represent exact matching between test trace components and reference trace components.

The case of exact matching is neglected, in this example. The insufficient and excessive testing measure $M_1$ and $M_2$, are considered respectively. $M_1$ and $M_2$ are calculated as:

$$M_1 = \sum_{k=1}^{W^{(l)}} T(k), \forall\, T(k) < 0,$$

$$M_2 = \sum_{k=1}^{W^{(l)}} T(k), \forall\, T(k) > 0.$$

A metric for missing coverage $M_3$ is obtained by summing the attribute values of the set $J^{(l)} = I^{(l)} - R^{(l)}$, with cardinality of the set given by $G^{(l)}$, $G^{(l)} \leq X^{(l)}$:

$$M_3 = \sum_{k=1}^{G^{(l)}} f^{(l)}(j)\bigg|_{[1,2,\ldots,G^{(l)}]}.$$

Similarly, the measure of excessive coverage $M_4$ is calculated by summing up the attribute values of the set $B^{(l)} = R^{(l)} - I^{(l)}$, with cardinality $O^{(l)}$:

$$M_4 = \sum_{k=1}^{O^{(l)}} g^{(l)}(j)\bigg|_{[1,2,\ldots,O^{(l)}]}.$$

If the attribute represents l-word name or frequency, normalizing the measures by $N_l^{IP}$ is recommended, where $N_l^{IP}$ is the total number of l-words in the test trace. Upon normalization four values of M will be in the following range: $M_1 \in [0,1)$, $M_2 \in (-\infty, 0]$, $M_3 \in [0,1]$, and $M_4 \in [0,\infty)$.

Depending on the task, a set of reference traces may be sorted by different members of M. For example, to find close reference traces for a given test trace, the set M can be sorted by $M_3$ in ascending order, $M_1$ in ascending order, $M_2$ in descending order, and $M_4$ in ascending order.

The coverage testing process shown in FIG. 10 can thus be described as set $M = \{M_1, M_2, M_3, M_4\}$. The closest reference trace to a given test trace then will be given by $\{0,0,0,0\}$. Similarly, furthest reference trace to a given test trace will be given by $\{0,0,1,\infty\}$.

In the context of FIG. 10, a numerical example for calculation of the coverage testing measure is given below:

$$M = \frac{\{M_1, M_2, M_3, M_4\}}{N_l^{IP}}$$

$$= \frac{\{1, -2, 2, 2\}}{7}$$

$$\approx \{0.14, -0.29, 0.29, 0.29\}.$$

This metric provides a simple and intuitive measure of how close traces or sets of traces are to each other. Empirically, this metric provides a good balance between complexity and the ability to discriminate.

For "L" words of length 1 or 2, the dictionary size, on average, is of order 10,000 members. In the worst case scenario, dictionary size grows quadratically with l. However, in practice, the dictionary size usually grows linearly with l.

Figure 11:
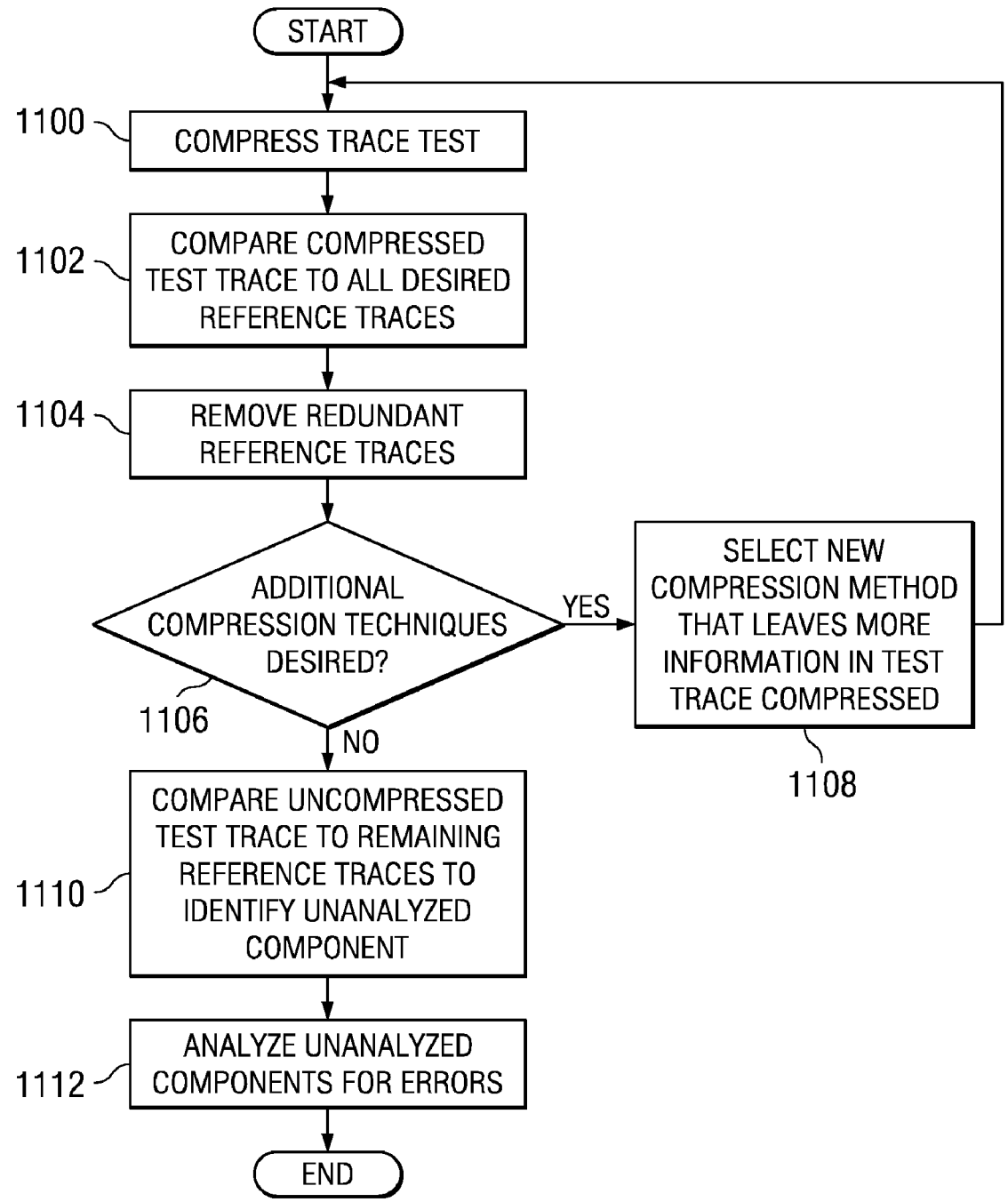
FIG. 11 is a flowchart of a process for performing software testing in accordance with an illustrative embodiment.

FIG. 11 is a flowchart of a process for performing software testing in accordance with an illustrative embodiment. The process shown in FIG. 11 can be implemented in a data processing system, such as data processing system 100 shown in FIG. 1 or data processing system 200 shown in FIG. 2. The process shown in FIG. 11 can be implemented in computer-usable program code stored in such a data processing system. The process shown in FIG. 11 can be implemented using various software components, such as software components 800 through 808 in FIG. 8 using techniques described with respect to FIG. 9 and FIG. 10.

The process begins as the data processing system's processor compresses a test trace (step 1100). Next, the processor compares the compressed test trace to all desired reference traces (step 1102). The processor then removes redundant reference traces (step 1104). A redundant reference trace is a reference trace that has substantially different components than the test trace.

Next the processor determines if use of additional compression techniques is desired (step 1106). If additional compression techniques are desired, then the processor selects a new compression method that leaves more information in the resulting compressed test trace (step 1108). The process then returns to step 1100 and repeats.

If additional compression techniques are not desired, then the processor compares the uncompressed test trace to all remaining reference traces in order to identify unanalyzed components in the test trace (step 1110). The resulting comparison can be stored in a memory of the data processing system. Optionally, the processor analyzes unanalyzed components for errors (step 1112). The process terminates thereafter. However, any errors in the components can be corrected in order to improve the quality of the test trace and of the overall software program of which the test trace is a part.

Figure 12:
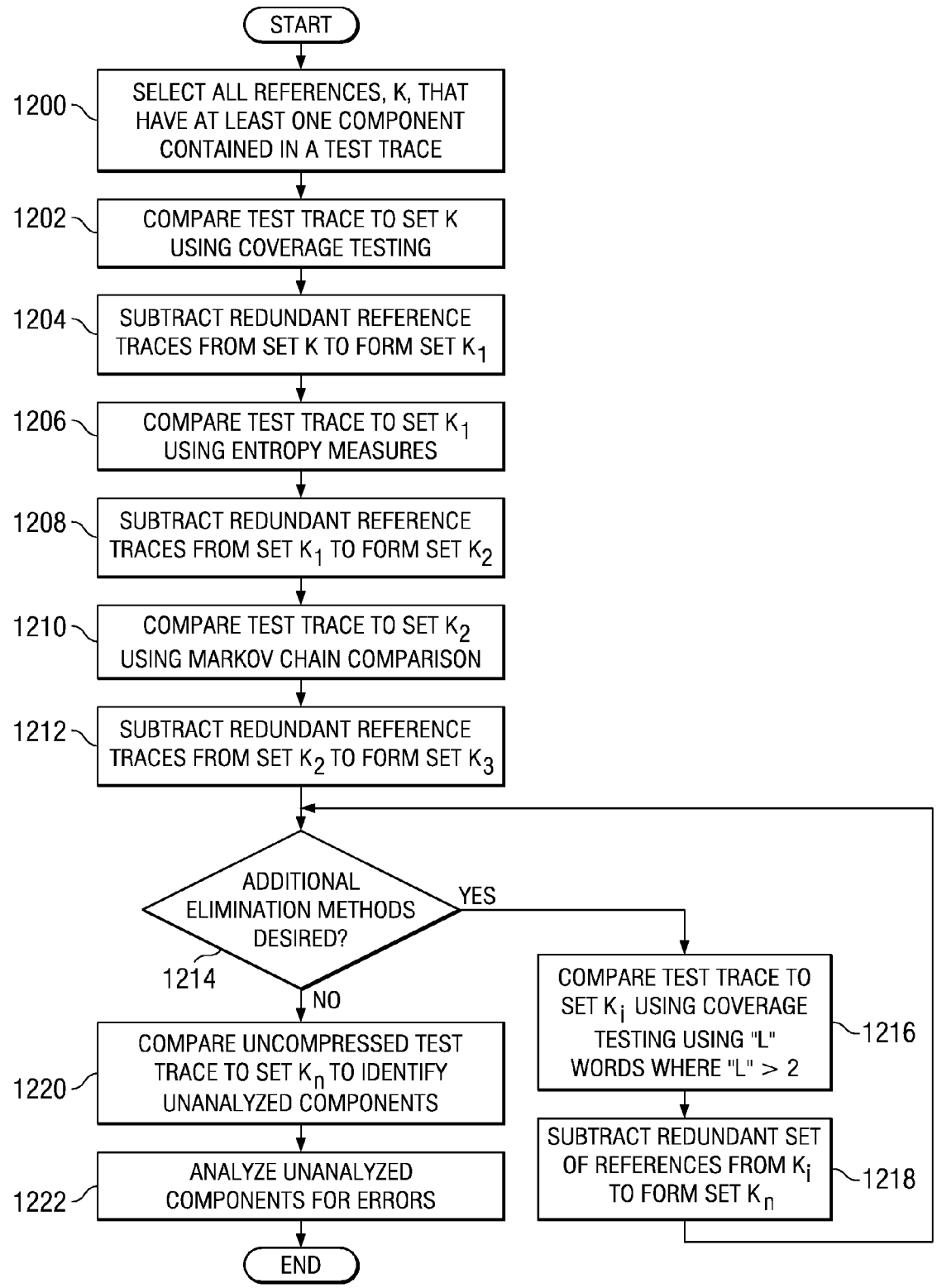
FIG. 12 is a flowchart of a process for performing software testing in accordance with an illustrative embodiment.

FIG. 12 is a flowchart of a process for performing software testing in accordance with an illustrative embodiment. The process shown in FIG. 12 can be implemented in a data processing system, such as data processing system 100 shown in FIG. 1 or data processing system 200 shown in FIG. 2. The process shown in FIG. 12 can be implemented in computer-usable program code stored in such a data processing system. The process shown in FIG. 12 can be implemented using various software components, such as software components 800 through 808 in FIG. 8 using techniques described with respect to FIG. 9 and FIG. 10. The process shown in FIG. 12 is an alternative and similar process to the process shown in FIG. 11.

The process begins as the processor selects all references, represented by the set K, that have at least one component contained in a test trace (step 1200). As described above, a component can be a function, a probe, or some other object in a trace. The processor then compares the test trace to the set K using a coverage testing for l-words technique (step 1202).

The processor then subtracts redundant reference traces from the set K to form the set $K_1$ of remaining reference traces (step 1204). As described above, a redundant reference trace is a reference trace that has very different components than the test trace. The processor compares the test trace, compressed using the entropy measures technique, to the set $K_1$ using a norms technique (step 1206).

The processor then subtracts any newly discovered redundant reference traces from the set $K_1$ to form the more narrow set of reference traces, $K_2$ (step 1208). As with step 1206, the processor compares the test trace to set $K_2$ using a Markov chain comparison technique (step 1210). Specifically, the test trace and reference traces in the set $K_2$ are compressed using "L" words technique and the processor compares the resulting test trace to the set $K_2$ using Markov chain comparison technique.

The processor then subtracts any newly discovered redundant reference traces from the set $K_2$ to form the even more narrow set of reference traces, $K_3$ (step 1212). At this point, the processor determines whether additional elimination methods are desired (step 1214). If additional elimination methods are desired, then the processor compares the test trace to set $K_3$ using coverage testing for "L" words, where "L" is greater than two (step 1216). Specifically, the test trace is compressed using coverage testing techniques, where "L" is selected to be greater than two, and the processor compares the resulting test trace to the set $K_i$, where $K_i$ is the current remaining set of reference traces.

The processor then subtracts redundant sets of references from set $K_i$ to form set $K_n$ (step 1218), with the process continuing to repeat from steps 1214 through 1218 for sets $K_i$ to $K_n$. Ultimately, the set of reference traces $K_n$ will become desirably narrow. At this point, at step 1214, no additional elimination methods are desired. Accordingly, the processor compares the uncompressed test trace to the set $K_n$ of reference traces in order to identify unanalyzed components (step 1220). The results are provided to a memory of the data processing system for further processing. For example, the processor can analyze the unanalyzed components for errors (step 1222). The process terminates thereafter. However, any errors in the components can be corrected in order to improve the quality of the test trace and of the overall software program of which the test trace is a part. The order of compression methods can be different.

Figure 13:
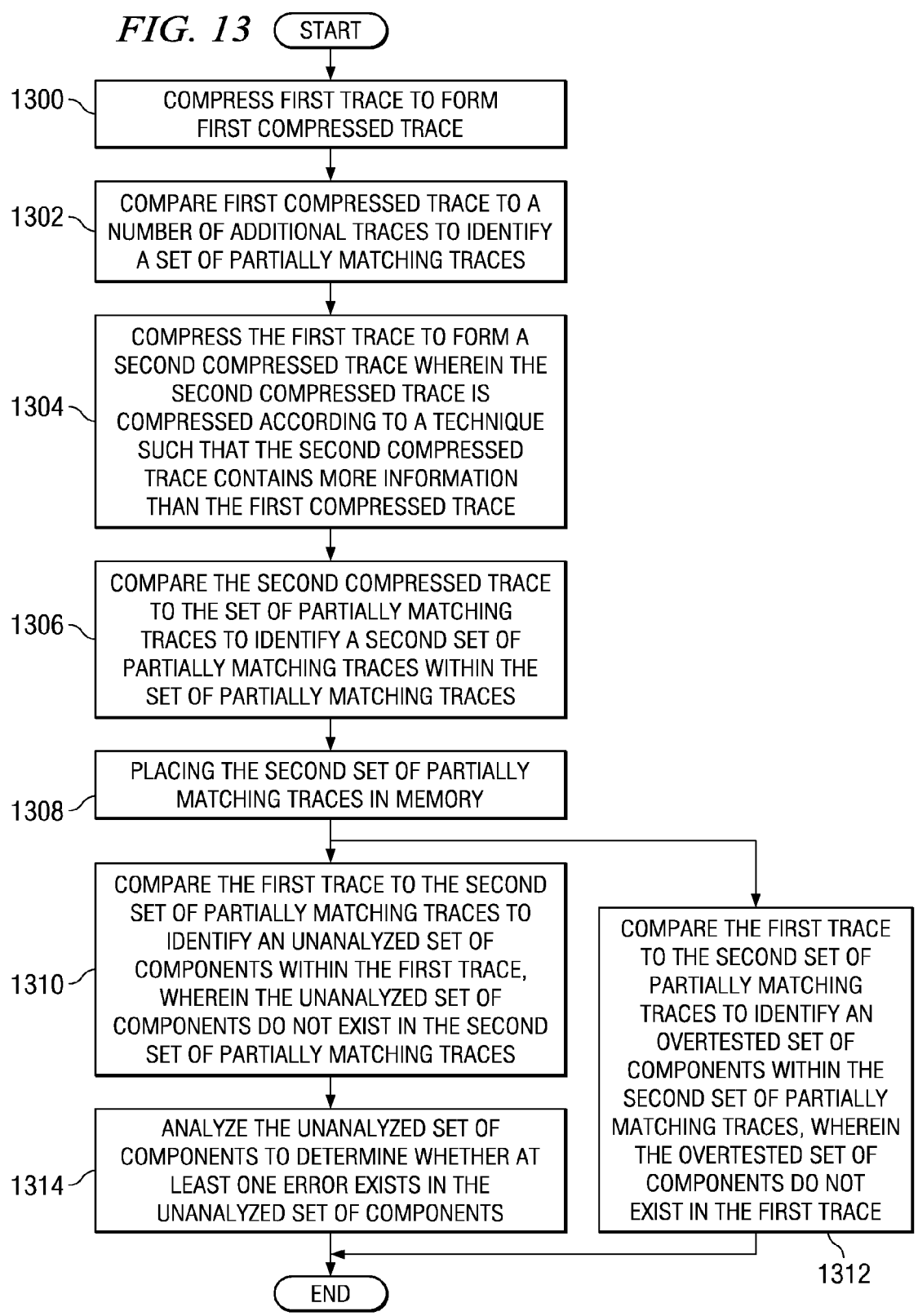
FIG. 13 is a flowchart of a process for performing software testing in accordance with an illustrative embodiment.

FIG. 13 is a flowchart of a process for performing software testing in accordance with an illustrative embodiment. The process shown in FIG. 13 can be implemented in a data processing system, such as data processing system 100 shown in FIG. 1 or data processing system 200 shown in FIG. 2. The process shown in FIG. 13 can be implemented in computer-usable program code stored in such a data processing system. The process shown in FIG. 13 can be implemented using various software components, such as software components 800 through 808 in FIG. 8 using techniques described with respect to FIG. 9 and FIG. 10. The process shown in FIG. 13 is an alternative and similar process to the processes shown in FIG. 11 and FIG. 12.

The process begins as the processor compresses a first trace to form a first compressed trace (step 1300). The processor then compares the first compressed trace to a number of additional traces to identify a set of partially matching traces (step 1302). A partially matching trace contains a number of components that match one or more components of another trace. The processor then compresses the first trace to form a second compressed trace, wherein the second compressed trace is compressed according to a technique such that the second compressed trace contains more information than the first compressed trace (step 1304).

The processor then compares the second compressed trace to the set of partially matching traces to identify a second set of partially matching traces within the set of partially matching traces (step 1306). The processor provides the second set of partially matching traces to a memory of the data processing system (step 1308).

Optionally, the processor compares the first trace to the second set of partially matching traces to identify an unanalyzed set of components (missing coverage) within the first trace, wherein the unanalyzed set of components do not exist in the second set of partially matching traces (step 1310). Optionally, in another illustrative example, the processor compares the first trace to the second set of partially matching traces to identify an overtested set (excessive coverage) of components within the second set of partially matching traces, wherein the overtested set of components do not exist in the first trace (step 1312).

Optionally, the processor then analyzes the unanalyzed set of components in the uncompressed test trace to determine whether at least one error exists in the unanalyzed set of components (step 1314). The process terminates thereafter. However, any errors in the components can be corrected in order to improve the quality of the test trace and of the overall software program of which the test trace is a part.

Figure 14:
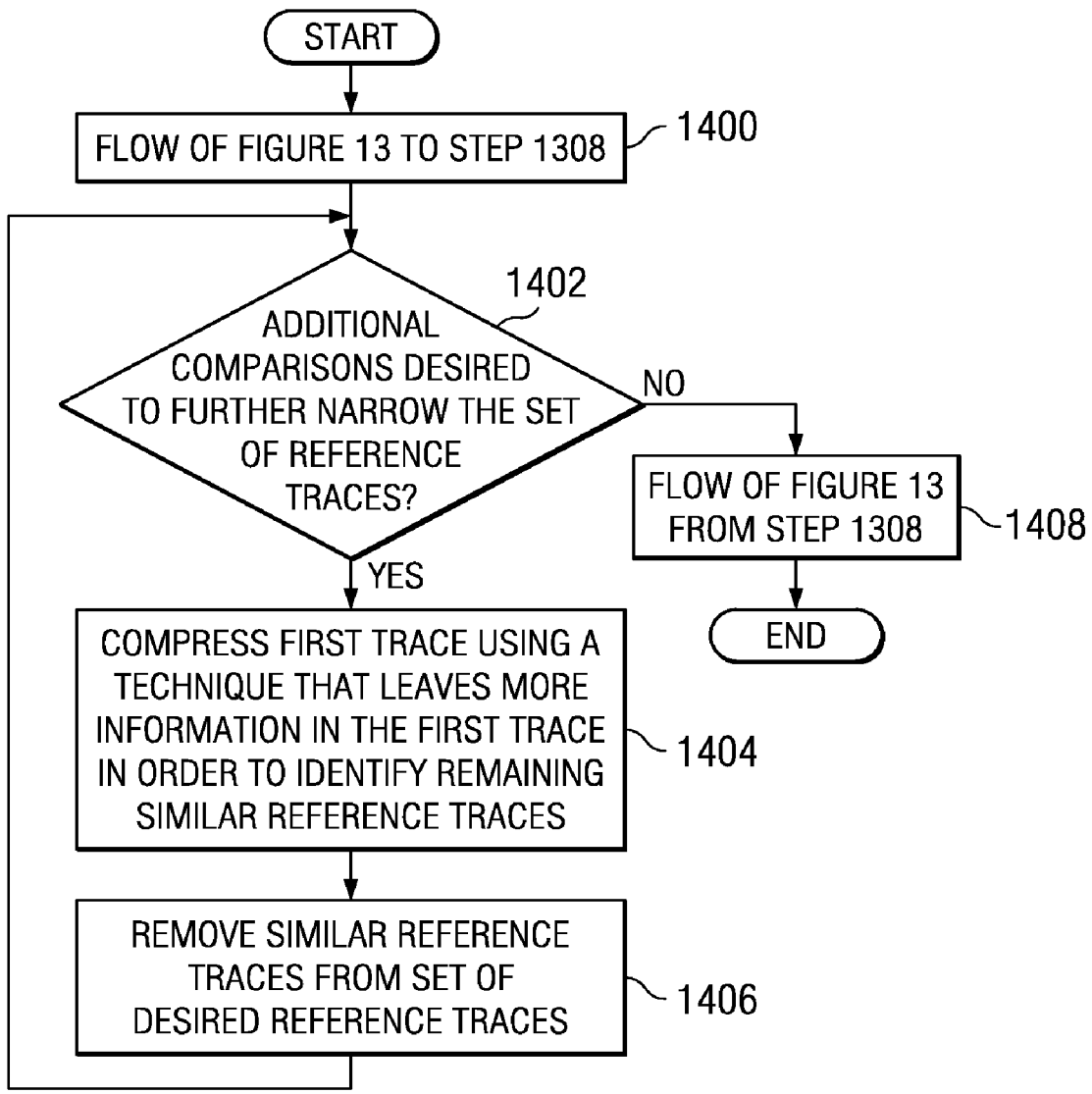
FIG. 14 is a flowchart of a process for performing software testing in accordance with an illustrative embodiment.

FIG. 14 is a flowchart of a process for performing software testing in accordance with an illustrative embodiment. The process shown in FIG. 14 can be implemented in a data processing system, such as data processing system 100 shown in FIG. 1 or data processing system 200 shown in FIG. 2. The process shown in FIG. 14 can be implemented in computer-usable program code stored in such a data processing system. The process shown in FIG. 14 can be implemented using various software components, such as software components 800 through 808 in FIG. 8 using techniques described with respect to FIG. 9 and FIG. 10. The process shown in FIG. 14 is an alternative and similar process to the processes shown in FIG. 11 through FIG. 13.

More specifically, the process shown in FIG. 14 adds to the process shown in FIG. 13. The process begins by performing steps 1300 through 1308 in FIG. 13 (step 1400). However, at that point, the processor determines if additional comparisons are desired to further narrow the set of reference traces (step 1402). If additional comparisons are desired, then the processor compresses the first trace using a technique that leaves more information in the first trace in order to identify remaining similar reference traces (step 1404). The processor then removes similar reference traces from the set of desired reference traces (step 1406). The process then returns to step 1402 and continues to repeat until no additional comparisons are desired.

When no additional comparisons are desired at step 1402, then the process continues at step 1308 in FIG. 13 (step 1408). The process terminates thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described with respect to FIG. 3 through FIG. 8 are described in terms of comparing one test trace to a set of reference traces. However, in addition, a first set of traces can be compared to a second set of traces or to multiple sets of traces. In general, multiple sets of traces can be compared to multiple additional sets of traces. The methods, processes, and devices described above can be used in any of these illustrative examples. Thus, for example, the term "test trace" in FIG. 11 or FIG. 12 could be replaced by the term "set of test traces." Likewise, the term "first trace" in FIG. 13 and FIG. 14 could be replaced by the term "first set of traces." Similar changes can be made in the other figures. However, the type of analysis or compression performed may vary for different implementations or different types of sets of traces to be compared. For example, for the analysis described below in the next paragraph, reference traces are analyzed with respect to each other for similarities. As used herein, the term "set of traces" includes one or more traces in the set, but usually indicates the presence of more than one trace in the set. Traces can be grouped in multiple ways, leading to the existence of multiple sets of traces.

The comparison of multiple sets of traces is particularly useful in large and/or complex software packages as there exist a very large number of possible execution paths. In one illustrative example, the reference traces are known as house traces and the user traces are known as user traces. Comparison of house traces with house traces can be performed to reduce the time and cost of testing, identify redundant functionality, merge overlapping test scenarios, and map the tests to the functionality covered. Thus, tests can be used in a targeted fashion by comparing house traces with house traces.

The comparison of multiple sets of traces is particularly useful in large and/or complex software packages as there exist a very large number of possible execution paths. In one illustrative example, the reference traces are known as house traces and the test traces are known as user traces. Comparison of house traces with house traces can be performed to reduce the time and cost of testing, identify redundant functionality, merge overlapping test scenarios, and map the tests to the functionality covered. Thus, tests can be used in a targeted fashion by comparing house traces with house traces.

In another illustrative example, sets of house traces are compared with sets of user traces. This comparison is useful to identify functionality that users do not use. By identifying unused functionality, developers can rebalance the importance of in-house test cases and identify and/or modify archaic code. This comparison is also useful to identify functionality that users frequently use. By identifying frequently used functionality, developers can optimize frequently used execution paths and/or provide additional desired functionality along or adjunct to those execution paths.

In yet another illustrative example, sets of user traces can be compared to sets of user traces. This comparison is useful to identify customer usage profiles. Customer usage profiles can be used to perform quality focus processes or assessments. For example, an assessment can be made as to whether certain customers cover the same or similar execution paths. Usage profiles can be categorized with respect to types of customers or individual customers in order to identify marketing information that would entice those customers to purchase a product or service related to the software being tested. Similarly, those customers under the same profile can be tested with the same test scenarios, which saves the developing organization time and money. Additionally, scenarios can be augmented based on execution paths of all customers within that particular group.

In summary, the illustrative embodiments described herein provide an enhanced method or process of performing software testing. A first set of traces is compressed to form a first set of compressed traces. The first set of compressed traces is compared to a plurality of additional traces to identify a set of partially matching traces within the plurality of additional traces. The first set of traces is compressed to form a second set of compressed traces. The second set of compressed traces is compressed according to a technique such that the second set of compressed traces contains more information than the first set of compressed traces. The second set of compressed traces is compared to the set of partially matching traces to identify a second set of partially matching traces within the set of partially matching traces. The second set of partially matching traces is placed in a memory. In one illustrative example, the first set of traces is a single test trace.

The illustrative embodiments described herein have several advantages over known processes and methods for testing software. Using known processes for testing software, a single compressed test trace is compared to hundreds or even thousands of reference traces. Information is often lost using this method and unanalyzed components may go undetected. The alternative known method, to compare an uncompressed test trace to all reference test traces, is unacceptably slow and costly.

In contrast, the illustrative examples described herein provide a computer-implemented method for iteratively reducing the number of reference traces. When a minimum or acceptable number of reference traces are achieved, then the uncompressed test race is compared only to those reference traces. Thus, the illustrative examples described herein provide an advantage in both speed and precision over known methods for testing software. Once unanalyzed components have been identified, the unanalyzed components can be specifically targeted for error testing.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of performing software testing, the computer-implemented method comprising:
   compressing a first set of traces to form a first set of compressed traces;
   comparing the first set of compressed traces to a plurality of additional traces to identify a set of partially matching traces within the plurality of additional traces;
   compressing the first set of traces to form a second set of compressed traces, wherein the second set of compressed traces is compressed according to a technique such that the second set of compressed traces contains more information than the first set of compressed traces;
   comparing the second set of compressed traces to the set of partially matching traces to identify a second set of partially matching traces within the set of partially matching traces;
   placing the second set of partially matching traces in a memory;
   comparing the first set of traces to the second set of partially matching traces to identify an unanalyzed set of components within the first set of traces, wherein the unanalyzed set of components do not exist in the second set of partially matching traces; and
   analyzing the unanalyzed set of components to determine whether at least one error exists in the unanalyzed set of components.

2. The computer-implemented method of claim 1 wherein the first set of traces is a first set of uncompressed traces.

3. The computer-implemented method of claim 1 further comprising:
   comparing the first set of traces to the second set of partially matching traces to identify an overtested set of components within the second set of partially matching traces, wherein the overtested set of components do not exist in the first set of traces.

4. The computer-implemented method of claim 1 wherein the first set of traces comprise a set of test traces and the plurality of additional traces comprise a plurality of reference traces.

5. The computer-implemented method of claim 1 wherein the first set of traces comprises a set of reference traces and the plurality of additional traces comprise a plurality of additional reference traces.

6. The computer-implemented method of claim 1 wherein the first set of traces is a set of test traces and the plurality of additional traces comprise a plurality of additional test traces.

7. The computer-implemented method of claim 1 wherein the first set of compressed traces and the second set of compressed traces are compressed according to a technique selected from the group consisting of entropy measures, coverage testing for L-words, and Markov chain comparison.

8. The computer-implemented method of claim 7 wherein L equals an integer selected from the set of positive real numbers.

9. The computer-implemented method of claim 1 wherein the first set of traces comprises one trace.

10. A computer program product comprising:
a non-transitory computer usable medium having computer usable program code for performing software testing, said computer program product including:
computer usable program code for compressing a first set of traces to form a first set of compressed traces;
computer usable program code for comparing the first set of compressed traces to a plurality of additional traces to identify a set of partially matching traces within the plurality of additional traces;
computer usable program code for compressing the first set of traces to form a second set of compressed traces, wherein the second set of compressed traces is compressed according to a technique such that the second set of compressed traces contains more information than the first set of compressed traces;
computer usable program code for comparing the second set of compressed traces to the set of partially matching traces to identify a second set of partially matching traces within the set of partially matching traces;
computer usable program code for placing the second set of partially matching traces in a memory;
computer usable program code for comparing the first set of traces to the second set of partially matching traces to identify an unanalyzed set of components within the first set of traces, wherein the unanalyzed set of components do not exist in the second set of partially matching traces; and
computer usable program code for analyzing the unanalyzed set of components to determine whether at least one error exists in the unanalyzed set of components.

11. The computer program product of claim 10 further comprising:
computer usable program code for comparing the first set of traces to the second set of partially matching traces to identify an overtested set of components within the second set of partially matching traces, wherein the overtested set of components do not exist in the first set of traces.

12. A data processing system comprising:
a processor;
a bus connected to the processor;
a non-transitory computer usable medium connected to the bus, wherein the non-transitory computer usable medium contains a set of instructions for performing software testing, wherein the processor is adapted to carry out the set of instructions to:
compress a first set of traces to form a first set of compressed traces;
compare the first set of compressed traces to a plurality of additional traces to identify a set of partially matching traces within the plurality of additional traces;
compress the first set of traces to form a second set of compressed traces, wherein the second set of compressed traces is compressed according to a technique such that the second set of compressed traces contains more information than the first set of compressed traces;
compare the second set of compressed traces to the set of partially matching traces to identify a second set of partially matching traces within the set of partially matching traces;
place the second set of partially matching traces in a memory;
compare the first set of traces to the second set of partially matching traces to identify an unanalyzed set of components within the first set of traces, wherein the unanalyzed set of components do not exist in the second set of partially matching traces; and
analyze the unanalyzed set of components to determine whether at least one error exists in the unanalyzed set of components.

13. The data processing system of claim 12 wherein the processor is further adapted to carry out the set of instructions to:
compare the first set of traces to the second set of partially matching traces to identify an overtested set of components within the second set of partially matching traces, wherein the overtested set of components do not exist in the first set of traces.

14. The data processing system of claim 12 wherein the first set of traces comprise a set of test traces and the plurality of additional traces comprise a plurality of reference traces.

* * * * *